United States Patent [19]
Nishioka et al.

[11] Patent Number: 5,922,087
[45] Date of Patent: Jul. 13, 1999

[54] STABLE LIQUID SUSPENSIONS AND METHOD FOR ANALYZING SAME

[75] Inventors: Masato Nishioka, Charlotte; Michel M. Trawalter, Denver; Catherine S. Ho, Charlotte; Livius T. Percy, Charlotte; May N. Szeto, Charlotte; Yi Lai Wang, Charlotte; Guido J. Danhieux, Charlotte; Jon W. Merkert, Charlotte; Dwayne R. Myers, Belmont, all of N.C.

[73] Assignee: Clariant Finance (BVI) Limited, Tortola, Virgin Islands (Br.)

[21] Appl. No.: 08/707,876

[22] Filed: Sep. 9, 1996

Related U.S. Application Data

[63] Continuation-in-part of application No. 08/506,501, Jul. 25, 1995, abandoned, which is a continuation-in-part of application No. 08/425,560, Apr. 20, 1995, abandoned.

[51] Int. Cl.$^6$ .................................. D06P 1/30; D06P 1/48
[52] U.S. Cl. ........................... 8/527; 8/528; 8/652; 8/561
[58] Field of Search .................. 8/528, 650, 652, 8/527, 552, 561

[56] References Cited

U.S. PATENT DOCUMENTS

| | | | |
|---|---|---|---|
| 3,427,226 | 2/1969 | McNeely | 195/31 |
| 3,957,432 | 5/1976 | Kuryla . | |
| 3,989,592 | 11/1976 | Leavitt | 195/29 |
| 4,265,631 | 5/1981 | Becker | 8/471 |
| 4,297,100 | 10/1981 | Koci et al. | 8/527 |
| 4,329,448 | 5/1982 | Cox et al. | 536/123 |
| 4,436,523 | 3/1984 | Hugelshofer et al. | 8/527 |
| 4,468,230 | 8/1984 | Thomas et al. | 8/528 |
| 4,713,449 | 12/1987 | Vanderslice et al. | 536/123 |
| 4,767,463 | 8/1988 | Brode et al. | 106/162 |
| 4,992,078 | 2/1991 | Meszaros | 8/444 |
| 5,281,354 | 1/1994 | Faber | 252/154 |
| 5,308,647 | 5/1994 | Lappi | 427/154 |
| 5,385,585 | 1/1995 | Kiesewetter et al. | 5/562 |
| 5,470,356 | 11/1995 | Meszaros | 8/652 |
| 5,632,782 | 5/1997 | Carlough | 8/474 |

FOREIGN PATENT DOCUMENTS

| | | |
|---|---|---|
| 1001004 | 6/1962 | United Kingdom . |
| 2022147 | 12/1979 | United Kingdom . |

OTHER PUBLICATIONS

Derwent Abstract No. 80–74144C of Japanese Kokai 55113954 with English translation of full text of kokai Sep. 2, 1980.

Xanthan Gum Natural biogum for scientific water control (Jun. 1994), Kelco Division of Merck & Co., Inc.

*Primary Examiner*—Margaret Einsmann
*Attorney, Agent, or Firm*—Thomas C. Doyle

[57] ABSTRACT

Stable, pourable aqueous suspensions of solid particulate materials are provided, especially suspensions of sulfur dyes which are characterized a very low content of inorganic sulfides and inorganic polysulfides. The suspensions are produced using certain suspension stabilizing agents, particularly polysaccharides, such as xanthan gum, whose solutions in water are pseudoplastic. The suspensions may further comprise a non-sulfide reducing agent. An improved method is also provided for determining the the potential for such suspensions to release hydrogen sulfide upon being acidified at a given temperature, which method comprises acidifying a sample of the suspension to pH 2.9–3.7, capturing all of the hydrogen sulfide released during acidification in aqueous alkali and measuring the sulfide ion content of the aqueous alkali.

65 Claims, No Drawings

STABLE LIQUID SUSPENSIONS AND METHOD FOR ANALYZING SAME

This application is a continuation-in-part of application Ser. No. 08/506,501, filed Jul. 25, 1995 now abandoned, which is a continuation-in-part of application Ser. No. 08/425,560, filed Apr. 20, 1995, now abandoned.

BACKGROUND OF THE INVENTION

This invention relates to stable liquid suspensions of finely divided particulate matter and to a method useful for determining their capacity to emit hydrogen sulfide.

It is often preferred in the textile dyeing and finishing art to use products which are in the form of liquid compositions. Such compositions have certain advantages over powdered or granular compositions. They are dust-free and they are better suited for use in automated equipment wherein they are pumped in metered quantities from a storage or holding container to a textile treatment apparatus. It is usually desired that the successive charges be uniform. This is especially true with regard to dyeing, wherein it is important that each charge of a given liquid dye composition be of the same strength, so that consistent dyeings can be achieved over a given period of time during which several successive:charges will be delivered from a given container to a given dyeing apparatus. It is desirable, therefore, that the liquid remain pumpable and easily stirrable, so that uniformity can be restored, if necessary, when a charge is to be delivered from the container to the, textile treatment (e.g. dyeing) apparatus. It is also desirable that the liquid be sufficiently stable so that it will remain uniform throughout the period of its residence in a container.

In the field of sulfur dyes the switch from dry powders or granules to liquids for the dyeing of textile materials was made several years ago with the advent of prereduced sulfur dye liquids, i.e. aqueous solutions of sulfur dyes which are in the reduced (leuco) form. Such liquids are usually produced by heating a sulfur dye in an aqueous alkaline medium and invariably they involve the presence of one or more inorganic sulfides, such as sodium sulfide, and/or one or more inorganic polysulfides. Such a compound may be carried over from a thionation reaction by which a sulfur dye is produced, or it may be generated in situ during the solubilization of such a dye as a result of the action of alkali on unreacted sulfur from the thionation reaction which is present with the dye, or it may be added to the aqueous alkaline medium as a reducing agent during the solubilization of the dye or for the purpose of preventing premature reoxidation of the leuco dye during shipment or storage, or its presence may result from a combination of these factors. Because of the adverse effects of sulfides on the environment and especially because of the potential health risks associated with the possible generation of dangerous amounts of toxic hydrogen sulfide gas by intentional or accidental addition of acid to a dye liquid containing sulfides, a concerted effort has been made to produce prereduced sulfur dye liquids of decreased sulfide content. While progress has been made, the goal of a commercially acceptable prereduced sulfur dye liquid which is sulfide-free or of such low sulfide content as to be essentially risk-free but which has the stability and other properties required by the textile dyeing industry has heretofore not been achieved.

Aqueous suspensions of sulfur dyes in solid particulate form can be produced which are sulfide-free or of such low sulfide content as to pose little or no sulfide-related hazard to humans or their environment. However, such compositions which have all of the other properties necessary to make them viable alternatives to the prereduced sulfur dye liquids have heretofore not been available at an acceptable cost. The present invention provides such compositions as well as liquid suspensions of other materials which are in solid particulate form.

SUMMARY OF THE INVENTION

According to the first aspect of the present invention there are provided pourable suspensions (S) of solid particulate material in a liquid and methods of making and using such suspensions (S).

More particularly, the present invention provides stable, pourable suspensions (S) of solid particulate material in a liquid.

Still more particularly, the present invention provides such suspensions (S) which contain an effective amount of a suspension stabilizing agent (A).

The invention is especially concerned with such suspensions (S) as described above wherein the solid particulate material is a sulfur dye (hereinafter "suspensions (S')") and, most especially, such sulfur dye suspensions (S') which release little, if any, hydrogen sulfide, upon being acidified.

The invention also provides an improved method for measuring the capacity for a sulfur dye composition to release hydrogen sulfide upon being acidified.

DETAILED DESCRIPTION OF INVENTION

By "pourable" is meant that the suspension (S) has a viscosity which will enable it to flow freely from a container, preferably a viscosity no higher than 10,000 centipoise (cP), more preferably no higher than 5000 cP, most preferably no higher than about 4000, especially 3000, cP.

Usually a suspension (S) according to this invention will have a viscosity of at least 30 cP, preferably at least 100 cP, more preferably at least 250 cP, most preferably at least 300 cP, especially at least about 400 cP.

Sulfur dye suspensions (S') according to this invention having viscosities in the range 250 to 2000 cP, especially 350 to 2000 cP, have been found to be quite satisfactory.

The viscosities stated above are those determined in known manner at 25° C. and 60 rpm using a Brookfield Viscometer, model LVT, with a #3 spindle for viscosities up to 2000 cP and a #4 spindle for viscosities above 2000 cP.

Preferably, a suspension (S) according to this invention is one in which the distribution of the solid particles of material throughout the liquid is substantially uniform. By this is meant that any two equal volumetric portions of the suspension (S) which are removed therefrom at the same time will contain substantially equal amounts, by weight, of said solid particles. By "substantially equal amounts, by weight" is meant that the amounts, by weight, of said material in the respective portions are sufficiently identical that the two volumetric portions, when used separately for their intended purpose under identical conditions, will produce substantially identical results. By "material" here is meant the essential solid material of the suspension (S). For example, when the material is a dye, the two equal volumetric portions, when used in two separate but identical textile dyeing procedures, will produce dyeings of substantially equal tinctorial strength, i.e. within ±5%, preferably ±3%, of one another as measured in known manner using a spectrophotometer, such as the Model CS-5 which, together with appropriate computer software, is available from Applied Color Systems, Incorporated. More preferably, the weights of the solid particulate material in each portion are, themselves, within ±5% of one another.

Preferably, the above-described uniformity applies also to the distribution of the suspension stabilizing agent (A), which is described more fully hereinafter.

The concentration of the solid particulate material in the suspension (S) may vary within fairly wide limits, depending somewhat on the intended use. For example, when the solid material is a dye, its concentration may be dictated in part by the desired tinctorial strength of the suspension (S). In general, concentrations of 5% or more, based on the total weight of the composition, are contemplated, with concentrations of 20% or more being preferred. Concentrations of the solid particles may be as high as 60%, with concentrations as high as 50% being preferred. For sulfur dyes concentrations in the range 10 to 45%, by weight, have been found to be especially suitable.

The size of the solid particles may vary, depending on other characteristics of the suspension (S). They should not be so large as to have too great a tendency to settle out of the suspension (S). While such a tendency can be overcome to a significant extent by the use of a suspension stabilizing agent (A) as described hereinafter, the particles should not be so large that they require the presence of a suspension stabilizing agent (A) in such a large amount as will increase the viscosity of the suspension (S) to a point where it is no longer pourable. Also, in the case of solid sulfur dye particles, they should be small enough to be readily dissolved during a dyeing procedure. Suitable particle sizes can be determined and produced by a person of ordinary skill in the art without undue experimentation. Preferably, at least 99%, ideally all of the particles are smaller than 400 microns (diameter), more preferably smaller than 200 microns, with particles less than 120 microns being most preferred, especially for solid particulate sulfur dyes, where mean particle volumes (i.e. mean particle diameter of the volume distribution) of 50 microns or less are especially suitable. Preferably, the solid particulate material has a mean particle volume greater than 5 microns, more preferably greater than 10 microns. The particle size can be measured using a Microtrac II particle size distribution analyzer Model #7997-10 or #7997-20 or by using a "Malvern Mastersizer" Model MS 1002 from Malvern Instruments, Malvern, England. For many sulfur dyes a suitable particle size is usually obtained directly from the thionation reaction or, if necessary, from a subsequent treatment whereby the dye is precipitated from the thionation reaction mixture, as described below, with little or no mechanical size reduction treatment. In other cases conventional mechanical size reduction, such as milling, can be carried out where necessary to achieve a desired particle size. C.I. Sulfur Black 1 is among those sulfur dyes which are suitable for processing into a suspension (S') in the form in which it is obtained by aeration of its thionation reaction mass without milling.

Preferably, a composition (i.e. suspension (S)) according to this invention is stable to the extent that it will retain its above-described uniformity for a period of at least 24 hours, more preferably for at least two weeks, most preferably for at least two months, even for 6 months or more, on standing at temperatures in the range 2 to 35° C.

Preferably, a composition according to this invention is also stable against a permanent change in viscosity for the times and under the conditions specified in the preceding paragraph. By "change in viscosity" is meant such an increase as will render the suspension (S) unpourable or such a decrease as will adversely affect the stable uniformity described above. More preferably, it means a change of more than 50% measured in cP as described above. By "permanent" is meant a change which cannot be undone by stirring, pumping or otherwise agitating the suspension. More preferably, it is stable against any change in viscosity, permanent or otherwise, which will render it unpourable. Most preferably, it is stable against any change in viscosity which will irreversibly modify its flow rate by more than 50% or even more than 20%.

The liquid component of the suspension (S) is one in which the material comprising the solid particulate material is insoluble or soluble to an extent of no more than about 20%, preferably no more than 10%, more preferably no more than 5%, most preferably no more than 1%, by weight of the material, at 22° C. at the concentrations at which it is to be present in the suspension (S). The liquid component is also one in which the suspension stabilizing agent (A), which, as discussed hereinafter, may be a viscosity regulating agent, is soluble in the amounts employed, particularly at temperatures in the range 5 to 80° C., especially 10 to 50° C. Preferably, it is an aqueous liquid, i.e. water or a mixture of water and no more than about 60%, preferably no more than about 20%, more preferably no more than 10%, by weight of such mixture, of a suitable water-miscible organic liquid, such as acetone, methanol, isopropanol, ethylene glycol, propylene glycol, diethylene glycol or glycerol. Most preferably, the liquid component consists of water alone.

The solid particulate material may be any finely divided material which one desires to suspend in a liquid in which it is insoluble or only sparingly soluble. Among these materials are UV absorbers, optical brighteners, pigments and dyes such as sulfur dyes, vat dyes, disperse dyes and indigo. As indicated above, the suspensions (S) of this invention which are of particular interest and advantage are those in which the solid particulate material is a water-insoluble or sparingly soluble sulfur dye. Preferably, it is such a sulfur dye which is sufficiently free of inorganic sulfides and polysulfides that an aqueous mixture of said dye, upon being acidified to pH 3 with phosphoric acid at 22° C., will generate no more hydrogen sulfide than can produce a maximum of 1000 parts per million, by weight, sulfide ion ($S^{--}$) in aqueous alkali, based on the weight of the dye, more preferably no more hydrogen sulfide than can produce a maximum of 500 ppm, most preferably a maximum of 250, especially 100, most especially 50 ppm sulfide ion, based on the weight of the dye.

Preferably, the sulfur dye is in the oxidized form.

The term "sulfur dye" as used herein, is intended to include those dyes which are known as "Sulfur Dyes" or "Sulfurized Vat Dyes" from VENKATARAMAN "The Chemistry of Synthetic Dyes" Vol. 11, Chapters XXXV and XXXVI (1952) and Vol. VII (1974) or defined in the Colour Index as "Sulfur Dyes" or as "Vat Dyes" with an indication of sulfurization in the method for their synthesis. Representative dyes are C.I. Sulfur Black 1, C.I. Sulfur Blues 7, 13 and 15, C.I. Sulfur Reds 10 and 14, C.I. Sulfur Greens 2 and 16, C.I. Sulfur Browns 3, 37 and 96 and C.I. Vat Blue 43. Of highest interest are those dyes which are known as "Sulfur Dyes" from the aforementioned references, particularly C.I. Sulfur Black 1.

The solid sulfur dye particles can be obtained from a thionation reaction mass which, in turn, can be obtained by a conventional thionation reaction. Such reactions are well known in the art for making sulfur dyes, as disclosed in the aforementioned references. The particular thionation reaction employed is not critical to this invention, but, rather, is dictated by the particular sulfur dye which it is desired to produce.

Sulfur dyes which are characterized by the above-discussed degree of freedom from inorganic sulfides and polysulfides may be produced in various ways. Preferably, the thionation reaction mass is oxidized. This has the effect of causing dissolved sulfur dye which may be present in its reduced (leuco) form in the thionation reaction mass to precipitate by converting such dye to its water-insoluble oxidized form and converting inorganic sulfide and/or polysulfide salts present in said mass to thiosulfate salts. Oxidation may be effected using various known electron-accepting substances or sources of oxygen, e,g. sodium nitrite, sodium sulfite, a peroxide (e.g. $H_2O_2$ or sodium peroxide) or air. Gaseous oxygen can also be used, but is not preferred. Strong oxidizing agents can cause depolymerization of some suspension stabilizers (A), such as xanthan gum. This can be avoided by either not using an excess of such an oxidizing agent or by separating any such excess from the dye before combining the dye with such a suspension stabilizer (A). Oxidation is preferably effected by aeration of an aqueous mixture of the crude thionation reaction product, e.g. by bubbling air into the aqueous mixture while it is being agitated. The rate of aeration is not critical, but is preferably such as to produce particles of the above-disclosed particle size or close enough to such particle size that extensive mechanical size reduction will not be required, more preferably such that no milling is required. It is well within the skill of the art to determine a suitable rate without undue experimentation. Satisfactory results have been obtained at an aeration rate of about 0.01 to 0.02 $m^3$ per minute per kilo of total mass being aerated. During aeration the temperature of the reaction mixture is usually maintained in the range 50 to 90, preferably 60 to 85° C. The pH may range from 7 to 14, preferably 9 to 12. Oxidation is preferably continued until all of the sulfur dye has precipitated. A convenient method of ascertaining when this point has been reached is to carry out a spot test. According to this test a representative sample of the resulting slurry is spotted on P8 Crepe filter paper at 40° C. The higher the proportion of dye which has precipitated, the greater will be the amount of dye solids in the center of the spot and the less will be the amount of color in the run out (spread) of the spot. When all of the dye has precipitated, the center of the spot will contain dye solids and the run out will be clear, preferably water clear. The aeration time can vary considerably, depending on the particular dye, the aeration rate and the amount of thionation reaction product being aerated. For some dyes, such as C.I. Sulfur Black 1, a significant proportion of the dye is already out of solution at the end of the thionation reaction and aeration times of about 0.5 to 4 hours have been sufficient to precipitate the remainder, while aeration times up to 48 hours may be required for other dyes which are more completely dissolved in the thionation reaction mixture.

The aqueous slurry of water-insoluble sulfur dye particles prepared as described above may be used as such for producing a stable suspension (S') according to this invention. On the other hand, one may separate the solid dye from the original aqueous medium by conventional methods, e.g. filtration, and then make a new slurry by mixing the filter cake with a fresh quantity of water or a mixture of water and a water-miscible organic liquid as described above. This latter technique is preferred for C.I. Sulfur Black I and for any other sulfur dyes where the initial aqueous slurry may have a higher salt content than is desired. It may also be used in instances where the initial slurry still contains some dissolved sulfur dye.

Another method of obtaining the sulfur dye in a suitable state, preferably in solid particulate form, from the thionation reaction mixture is to add sufficient acid to said reaction mixture to cause dissolved dye to be converted to a water-insoluble form and to convert inorganic sulfides and polysulfides which may be present to hydrogen sulfide which can be separated from the dye via a suitable scrubbing apparatus. A strong acid is preferably used. Acidification is typically carried out to pH 1.5–6 using sulfuric or hydrochloric acid. The extent to which the dye has precipitated can be checked using the spot test described above. The acidification may be carried out until the desired amount of dissolved dye has been converted to a water-insoluble form and the inorganic sulfide content of the resulting mixture has been sufficiently lowered and the resulting mixture may be used in forming the final suspension (S') or the acidified mixture may be filtered to separate the precipitated dye from any dye which has not precipitated and from inorganic sulfides and/or polysulfides which may remain dissolved in the mixture and the resulting filter cake then mixed with a fresh supply of a suitable aqueous medium which will comprise the liquid component of the final suspension (S').

If the sulfur dye is produced largely in solid particulate form by the thionation reaction, the reaction mixture can be filtered as is and the filter cake then mixed with fresh aqueous liquid and oxidized or acidified to pH 5 to 6, as necessary, to convert inorganic sulfide and/or polysulfide salts which may be present to hydrogen sulfide, which can be removed by known methods.

The aforementioned filter cakes may be subjected to an optional washing step prior to further processing. However, with C.I. Sulfur Black 1 it is preferred to omit such a washing step.

With some dyes, particularly C.I. Sulfur Black 1, it has been found to be advantageous for the pH to be in the range 5.5 to 6.5 at the beginning of the filtering step. A strong acid, such as sulfuric acid, may be used, as necessary, to achieve this.

Regardless of which of the foregoing methods of treating the thionation reaction mass is carried out, sufficient oxidation or acidification should be carried out, optionally with sufficient removal of still unconverted inorganic sulfides and/or inorganic polysulfides by filtration or decantation, that the solid particles of sulfur dye to be present in the final suspension (S') are free from such sulfides and polysulfides to the extent described above. This can be determined by testing an aliquot portion of the solid dye-containing liquid by acidifying it to pH 3 with phosphoric acid at 22° C., reacting all of the hydrogen sulfide produced thereby in aqueous sodium hydroxide and measuring the sulfide ion concentration of the resulting solution by ion chromatography, as described more fully hereinafter. If the sulfide ion concentration is greater than 1000 ppm, based on the weight of the dye, preferably if it is greater than 500 ppm, more preferably if it is greater than 250 or even 100 ppm, further oxidation or acidification should be carried out and/or more of the inorganic sulfide and/or polysulfide-containing liquid should be separated from the solid dye particles.

It will be understood that a combination of an oxidation treatment and an acidification treatment may be used to obtain a sulfur dye in the desired solid particulate form.

It is preferred that the pH of the sulfur dye suspensions (S') of this invention be in the weakly acidic to weakly basic range, more preferably in the range 6 to 9. For C.I. Sulfur Black 1, pH's in the range 6.5 to 7.5 have given very satisfactory results. This is not critical to the invention, but it makes these products less corrosive and hazardous. The pH can be adjusted, as necessary, by controlled addition of an effective amount of a suitable acid, such as acetic, phosphoric or, preferably, sulfuric acid to the sulfur dye-containing liquid. This may be done before or after the addition of a suspension stabilizing agent (A), but is preferably done beforehand.

When the dye has been precipitated and the content of inorganic sulfides and polysulfides is suitably low, water may be removed from or, more commonly, added to the aqueous dye mixture, as necessary, to adjust its dyeing strength to a predetermined standard. This may be done before or after adding the suspension stabilizing agent (A).

The suspension stabilizing agent (A) may be any substance which is effective for preventing a solid particulate material, as described above, from settling out of suspension in an aqueous liquid, as described above, for a period of time as described above without permanently increasing the viscosity of the suspension to a point where it is not pourable. Preferably, it is a substance which is effective for stabilizing the substantially uniform distribution, as described above, of the solid particulate material in the liquid without increasing the viscosity of the suspension, permanently or otherwise, to a point where it is not pourable. More preferably, it is a water-soluble substance which is effective for stabilizing the uniformity of the distribution of solid sulfur dye particles in an aqueous liquid.

Preferred suspension stabilizing agents (A) are those substances which are effective to stabilize the uniformity of a suspension (S) of a solid particulate material in an aqueous liquid, as described above, when present in an amount less than 10%, preferably less than 5%, more preferably less than 1% and most preferably less than 0.5%, by weight of the suspension (S). More preferably, they are substances, particularly polysaccharides, whose suspension stabilizing properties are related to their ability to increase the viscosity of an aqueous liquid in which they are dissolved and, more particularly, they are substances, especially polysaccharides, whose solutions in water are pseudoplastic. By "pseudoplastic" is meant that the apparent viscosity of the solution progressively decreases as the solution is subjected to increased shear stress. The viscosity almost instantaneously begins to return to its full magnitude as the shear stress is reduced to zero. The more preferred suspension stabilizing agents (A), such as xanthan gum, are also non-thixotropic under most conditions of use. By "non-thixotropic" is meant that an aqueous solution of such an agent does not decrease in viscosity under constant shear stress over a period of time. Another preferred characteristic of the stabilizing agent (A) is that its solutions in an aqueous liquid be viscoelastic. Among the preferred stabilizing agents (A) are microbial polysaccharides, such as dextran, gellan gum, rhamsan gum, welan gum and xanthan gum, of which the latter two having been found to be especially suitable. Xanthan gum is disclosed in the literature as having the following structural formula:

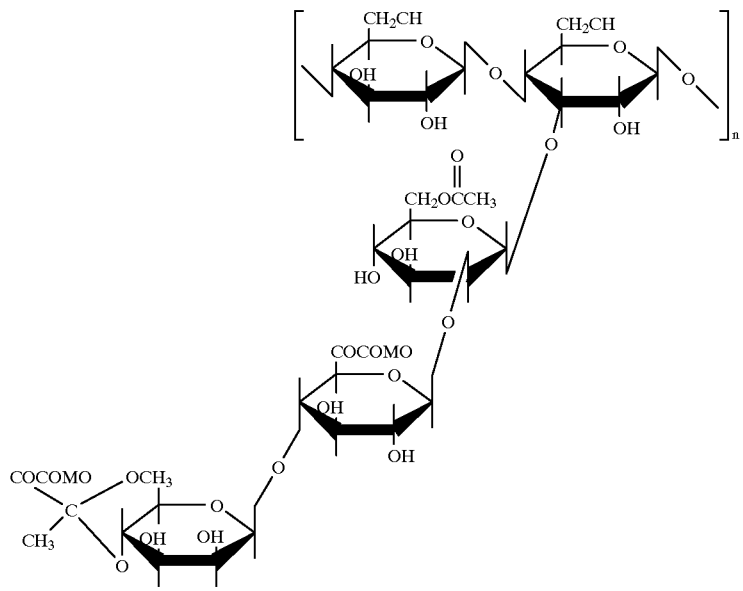

wherein M is Na, K or ½Ca and n is approximately 2000.

Xanthan gum is an exocellular heteropolysaccharide, which occurs naturally on plants belonging to the cabbage family and is produced commercially by aerobic submerged fermentation using the bacterium *Xanthomonas campestris* in a fermentation medium containing a carbohydrate (such as sugar) and nitrogen. A method for its production is disclosed in U.S. Pat. No. 3,427,226, the disclosure of which is incorporated herein by reference. It is on the TSCA inventory of the United States Environmental Protection Agency (CAS #11138-66-2). Additional information about this product, including the above formula, is contained in the booklet entitled "XANTIAN GUM *Natural biogum for scientific water control*", Fifth Edition (1994), distributed by Kelco (formerly a division of Merck & Co., Inc. and now a unit of Monsanto Company), the disclosure of which is incorporated herein by reference.

A stable suspension (S) according to this invention can be prepared by mixing the suspension stabilizing agent (A), the solid particulate material and the aqueous liquid. The solid particulate material and the aqueous liquid may be combined first and the stabilizing agent (A) added thereto or the stabilizing agent (A) and the aqueous liquid may be combined first and the solid particulate material added thereto or the stabilizing agent (A) and the solid particulate material may be added to separate portions of the aqueous liquid and the two aqueous mixtures then combined. For the preferred sulfur dye suspensions (S') of this invention the suspension stabilizing agent (A) may be added to an aqueous slurry of water-insoluble or sparingly soluble sulfur dye particles which has been produced as described above or such a slurry or a filter cake of the sulfur dye particles may be added to a solution of the stabilizing agent (A). The aforementioned components of the suspension (S) may be combined over a wide range of temperatures, e.g. 10 to 70° C., with excellent results having been obtained at about room temperature. The suspension stabilizing agent (A) is preferably added to the aqueous liquid, e.g. the aforementioned aqueous sulfur dye slurry, with agitation and at a rate such that the formation of lumps is avoided. This can be done by slowly introducing the stabilizing agent (A), preferably pre-mixed with aqueous liquid, at the upper portion of a vortex created by stirring of the aqueous liquid, e.g. slurry, to which it is being added. A particularly suitable method for mixing the stabilizing agent (A) with the aqueous liquid, e.g. slurry, comprises employing an apparatus of the type described on page 20 of the aforementioned booklet on xanthan gum. This apparatus comprises a mixing tank equipped with a stirrer and situated below a liquid supply line to which are attached a mixing eductor and a funnel. Before introducing the stabilizing agent (A), the mixing tank is filled with enough aqueous liquid, e.g. slurry, to cover the mixing blades of the stirrer when a vortex is developed. The stirrer is then turned on and flow of aqueous liquid is then started from the supply line into the eductor at a pressure of 50 to 100 psi and dry stabilizing agent (A) is poured into the funnel, which is attached to the top of the eductor. A mixture of aqueous liquid and stabilizing agent (A) is thereby introduced via the eductor into the aqueous liquid, e.g. slurry, which is already in the mixing tank. The resulting mixture is continuously stirred until the stabilizing agent (A) is dissolved. To further promote dissolution, said resulting mixture may be continuously recirculated from the lower portion to the upper portion of the mixing tank via a recirculation pump not shown in the aforementioned booklet on xanthan gum.

The amount of suspension stabilizing agent (A) vary, depending on the specific natures of the solid particulate material, the aqueous liquid and the stabilizing agent (A), and also on the concentration of the suspension (S). It is well within the skill of the art to determine a suitable amount for each situation. As indicated above, it should be such an amount as will stabilize the uniformity of the suspension (S) without permanently (i.e. irreversibly) increasing its viscosity to a point where it is not readily pourable at 25° C., preferably without rendering it even temporarily unpourable at 25° C. More preferably, it should be such an amount as will cause the suspension (S) to have a viscosity within the limits specified above in centipoise. This amount should be in the range 0.01 to 10% and is preferably less than 5%, more preferably less than 1%, by weight of the suspension (S) and, especially for the sulfur dye suspensions (S') of this invention, most preferably less than 0.5%, e.g. 0.1 to 0.4%.

A suspension stabilizing agent (A) may comprise, e.g. contain, more than one substance which is effective for preventing a solid particulate material, as described above, from settling out of suspension in an aqueous liquid, as described above, for a period of time as described above without permanently increasing the viscosity of the suspension to a point where it is not pourable. In such case, the above-specified amounts of suspension stabilizing agent (A) are preferably the total amounts of all compounds meeting the aforementioned description of a stabilizing agent (A).

Individual components may be added separately or in admixture to the aqueous liquid.

Preferably, a suspension stabilizing agent (A) whose solutions in water are pseudoplastic, more preferably a polysaccharide as described above, most preferably a polysaccharide gum having one or more of the preferred and/or more preferred characteristics mentioned above, especially xanthan gum, comprises more than 50%, more preferably more than 80%, most preferably 100%, by weight, of (A), i.e. the total amount of suspension stabilizing agent (A), as described above, in a suspension (S) of this invention.

Preferably, a suspension (S) of this invention contains a total of less than 10%, more preferably less than 5%, most preferably less than 1%, by weight, based on the total weight of the suspension (S), of viscosity-increasing agents or other substances which are effective to prevent a solid particulate material, as described above, from settling out of a suspension (S) other than a suspension stabilizing agent (A) as described above, especially in the last preceding paragraph, and an optional dispersing agent as discussed below. Especially preferred are those suspensions (S) which are free of said other viscosity-increasing agents or other substances.

In order to ensure against the the development of molds or bacteria over an extended period, it is often advantageous to add an effective amount of a biocide or preservative. The particular compound used will depend on the particular microorganisms present, the particular components of the suspension (S) and the pH. Technical Bulletin DB-31 entitled "Preservatives for Kelco Polymers Used in Industrial Applications" from Kelco (1986), the disclosure of which is incorporated herein by reference, lists thirty-five representative preservatives which have been used successfully with xanthan gum and from,among which a person skilled in the art can make an appropriate selection without undue experimentation. Among these are sodium dimethyldithiocarbamate (AQUATREAT DNM-30); sodium o-phenylphenate (DOWICIDE-A); formaldehyde; 6-aceto-2,4-m-dioxane (GIV-GUARD DXN); dichlorophene (GIVAUDAN G4); 2-hydroxypropyl methanethiolsulfonate (HPMTS-10); tributyl tin oxide (INTERCIDE 340A); 5-chloro-2-methyl-4-isothiazolin-3-one plus 2-methyl-4-isothiazolin-3-one (KATHON WT); benzyl bromoacetate (MERBAC 35); potassium trichlorophenate (METASOL CP); N-[-(1-nitroethyl) benzyl] ethylenediamine (METASOL J-26); methyl p-hydroxybenzoate (METHYL PARASEPT); 2-bromo-2-nitropropane-1,3-diol (MYACIDE AS); hexachlorodimethylsulfone (STAUFFER N-1386); 1,2 dibromo-2,4-dicyanobutane (TEKTAMER 38); and 2-[(hydroxymethyl)amino] ethanol (TROYSAN-174). The present inventors have had success using about 0.05 to 0.40%, particularly 0.15 to 0.35%, and especially 0.25 to 0.35%, based on the total weight of the stabilized suspension, of PROXEL GXL Liquid from ICI Americas, Specialty Chemicals Div., a preservative comprising 19% 1,2-benzisothiazolin-3-one, 5–8% sodium hydroxide, 40–60% dipropylene glycol and 10–40% water.

A suspension (S) according to this invention may also contain a dispersing agent. When a dispersing agent is used, an amount in the range 0.5 to 15%, especially 1 to 5%, by weight of the suspension, is suitable. Anionic dispersing agents are preferred. Particularly preferred dispersing agents are 1) a reaction product of lignin with disodium sulfite and formaldehyde (CAS #105859-97-0) available under the trademark REAX 83A and 2) a sulfonated xylene available under the trademark SOLEN. For some dyes, such as C.I. Sulfur Blue 7, C.I. Vat Blue 43, C.I. Sulfur Red 10, C.I.

Sulfur Brown 96 and particularly C.I. Sulfur Black 1, stable suspensions (S') according to this invention have been produced which contain no dispersing agent. It is within the skill of the art to determine whether a suspension of a particular sulfur dye can benefit from the presence, of a dispersing agent.

According to a further embodiment of this invention, there is provided a sulfur dye suspension (S') as described above which further contains a non-sulfide reducing agent (R) for the sulfur dye. By "non-sulfide reducing agent" is meant a reducing agent which is neither a sulfide nor a polysulfide.

The particular non-sulfide reducing agent (R) may vary, depending on the particular sulfur dye with which it is employed. Essentially, it should be one which does not have a reducing effect on the sulfur dye under the conditions at which the suspension is kept prior to being used, but which is effective to reduce the same dye in an aqueous medium under conditions which are more favorable for such reduction. More particularly, the reducing agent (R) should be one which will not cause reduction of the dye at the temperature and pH at which it is kept prior to being used in a dyeing process, e.g. at a pH of 9 or less, especially in the range 5 to 8, more especially 6 to 7, and a temperature below 60° C., especially below 45° C., but which does cause reduction of the dye at a pH above 9.5, especially above 10, and a temperature above 60° C., especially above 70° C.

A preferred reducing agent (R) is one which has the aforementioned properties and is a carbonyl compound, especially an aliphatic carbonyl compound which contains, in the alpha-position to the carbonyl group, an amino group which may be acetylated or, preferably, a hydroxy group or etherified hydroxy, e.g. methoxy, group. Of special interest are aliphatic compounds with 3 to 6 carbon atoms, such as 1-hydroxy acetone, 1,3-dihydroxy acetone, 3-hydroxy-2-butanone, carbohydrates with 3 to 6 carbon atoms and their derivatives in which one or more of the present hydroxy groups are etherified with methyl or replaced with an amino or acetylamino group, in particular aldo sugars and keto sugars and their oligomers and/desoxy-derivatives and further their uronic acids. Preferred carbonyl compounds may be represented by the following formulae (I) and (II):

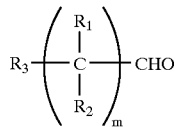
(I)

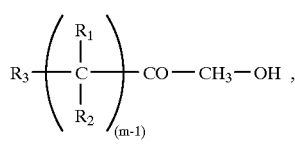
(II)

wherein one of $R_1$ and $R_2$ is hydrogen and the other is —OH, —OCH$_3$ or —NH$_2$, $R_3$ is —CH$_3$, —CH$_2$OH, —CHO or —COOX, X is hydrogen or a cation and m is an integer from 1 to 5.

X is advantageously a colorless cation, preferably an alkali metal cation, more preferably sodium.

If, in the formula (I), m is an integer from 2 to 5, the m symbols $R_1$ may have, independently, the same significance or different significances and the m symbols $R_2$ may have, independently, the same significance or different significances. In formula (I), one of $R_1$ and $R_2$ is hydrogen and the other preferably is hydroxy, $R_3$ preferably signifies —CH$_2$OH or, if m signifies 2 to 5, also a carboxy group and m preferably signifies 3 or, more preferably, 4. If, in formula (II), m signifies 3, 4 or 5, the (m−1) symbols $R_1$ may, independently, have the same significance or different significances and the (m−1) symbols $R_2$ may, independently, have the same significance or different significances. In formula (II) one of the two symbols $R_1$ and $R_2$ signifies hydrogen and the other preferably signifies hydroxy. If, in formula (II), m signifies 1, $R_3$ preferably signifies —CH$_3$ or —CH$_2$OH; if, in formula (II), m signifies 2, 3, 4 or 5, $R_3$ preferably signifies —CH$_2$OH. Of the compounds of formula (II), those in which m signifies 1, 3 or 4 are preferred. The monosaccharides of formula (I) and of formula (II) may also be in the pyranoside or furanoside form and the uronic acids of formula (I) and of formula (II) may also be in the lactone form. Representative reducing sugars are, in particular, aldopentoses, especially arabinose, ribose and xylose, and hexoses, especially glucose, fructose, mannose and galactose, and their desoxy, disdesoxy and aminodesoxy derivatives. As the reducing agent (R) there may also be employed oligosaccharides, in particular disaccharides, especially sucrose, lactose, maltose, melibiose and cellobiose, and tri-, tetra- and pentasaccharides, especially melezitose and raffinose, and syrups, such as corn syrup, malt syrup and molasses, which contain reducing sugars. The most preferred reducing agents (R) are those which reduce Fehling's solution, particularly reducing sugars, e.g. d-glucose.

The reducing agent (R) should also be one which does not negate the effectiveness of the suspension stabilizing agent. Preferably, the reducing agent (R) is one which does not interact with the suspension stabilizing agent (A) in such a way as to excessively diminish its stabilizing effectiveness. By this is meant that the reducing agent (R) is one whose presence in the suspension does not necessitate an increase of more than about 50% in the amount of the stabilizing agent (A) required, on the basis of the weight ratio of stabilizing agent (A) to total undissolved solids in the suspension (S'), to provide the same stability that the unincreased amount of the same stabilizing agent (A) provides to an otherwise identical suspension which contains the same total weight of undissolved solids in the form of sulfur dye alone and does not contain a reducing agent (R). More preferably, the reducing agent (R) is one which does not diminish the stabilizing effectiveness of the suspension stabilizing agent (A). It is within the ordinary skill of the art to make this determination without undue experimentation by comparing samples with and without the reducing agent.

The amount of the reducing agent (R) in the suspension (S') may vary, depending on the particular combination of reducing agent (R) and sulfur dye, the amount of sulfur dye and the purpose for which the reducing agent is added. An amount of reducing agent (R) may be used which is effective to reduce all of the sulfur dye with which it is combined in the suspension (S') when such combination is subjected to conditions effective for such reduction, as discussed above, particularly in a dyebath. This option offers the advantage that the correct amount of reducing agent is already present, so that the ultimate user does not have to calculate, weigh and add such amount. Furthermore, the correct amount can be added by the dye manufacturer or an intermediate processor (e.g. a jobber or converter) who may be more familiar with the chemical properties of the dye than is the ultimate user. On the other hand, the reducing agent (R) may be present in a lesser amount which provides the advantage of lessening the amount of reducing agent which must be added separately to a dyebath by the ultimate user to effect reduction of all of the sulfur dye. Preferably, the amount of reducing agent (R) is in the range 1 to 60%, more preferably 15 to 50%, most preferably 20 to 40%, by weight of the suspension (S').

Preferably, the reducing agent (R) is completely soluble in the suspension at 25° C. at the concentration at which it is present. However, a reducing agent (R) may be employed which is soluble under the conditions at which reduction is to be effected but insoluble or only partially soluble in the suspension under the conditions at which the suspension (S') is kept prior to being used in a dyeing process. In the latter situation the reducing agent (R) should be one whose undissolved amount can also be kept uniformly distributed throughout the suspension (S') by the suspension stabilizing agent (A) which may be employed in an increased amount, provided this does not cause the viscosity of the suspension (S') to vary from the parameters described above.

The reducing agent (R) may be mixed with the sulfur dye before, during or after addition of the suspension stabilizing agent (A). More particularly, the reducing agent (R) may be added to a stabilizer-containing sulfur dye suspension (S') produced as described above, or a mixture of the reducing agent (R) and the stabilizing agent (A) may be mixed with the sulfur dye, or the reducing agent (R) may be mixed with an aqueous slurry of sulfur dye particles produced as described above and the suspension stabilizing agent (A) then added to the resulting mixture. Conveniently, the reducing agent (R) is premixed with part of the water which is to constitute the aqueous phase of the suspension (S').

It is believed that the use of the preferred reducing agents (R) described above, particularly a reducing sugar, such as glucose, can provide the further advantage of decreasing the need which may exist in certain situations for the above-discussed addition of a biocide or preservative. For example, the use of a reducing sugar in an amount of about 30%, by weight of the suspension, could lower the required amount of biocide or preservative by about 50% or more, while amounts of about 50% or more reducing sugar, by weight of the suspension, could, in some instances, eliminate the need for a biocide or preservative where such a compound might otherwise be necessary. It will be appreciated that results will vary, depending on the particular suspension stabilizing agent (A), the particular reducing agent (R) and the particular microorganisms present.

In some instances it may be advantageous to subject the product to a brief treatment to break up any oversized lumps which might be present, such as by passing the suspension through a gear pump after combining all of the components.

The stable sulfur dye suspensions (S') which constitute a preferred embodiment of this invention have the advantage that together with their stability and flowability they have the characteristic of having a very low content of inorganic sulfides and inorganic polysulfides, which characteristic is achievable by the above described production method, especially with the aid of the inorganic sulfide measuring method mentioned above and described in greater detail hereinafter. They meet the same criteria for sulfides as set forth above for the aqueous mixtures of solid sulfur dye particles from which they are produced, when tested in the same manner, as described more fully below. Suspensions (S') which produce less than 50 ppm sulfide ion, based on the weight of the dye, have been obtained as a result of the oxidation or acidification of the dye prior to addition of the suspension stabilizer (A), as discussed above, and/or as a result of further oxidation which may take place during or after the addition of the stabilizer(A).

Suspensions (S) according to the present invention can be used for whatever purpose the solid particulate material suspended therein is normally employed. They are particularly well suited for use where a pourable, pumpable liquid composition is desired, particularly such a composition wherein uniform distribution of the solid particulate material is desired.

With particular regard to the sulfur dye suspensions (S'), they can be used to dye substrates, especially textile materials, dyeable with sulfur dyes, such as cotton, using conventional continuous or exhaust dyeing methods. More particularly, the dye is rendered substantive to the textile material by treatment with a suitable reducing agent in aqueous alkali and then oxidized back to its water-insoluble form once it has been uniformly applied to the textile material. Just as their very low sulfide content, and also the use of a stabilizing agent (A) consisting essentially of a water-soluble polysaccharide, makes the suspensions (S') of this invention advantageous from the standpoint of the environment, the use of these suspensions (S') in a dyeing process in which only non-sulfide reducing agents are employed in an aqueous alkaline medium is also advantageous for the environment. Such a process is disclosed in U.S. Pat. No. 5,234,465, the disclosure of which is incorporated herein by reference. Another suitable method comprises carrying out the dyeing using only non-sulfide reducing agents in an atmosphere of decreased oxygen content, preferably one in which the oxygen content is no more than 12% by volume, more preferably no more than 10% by volume, most preferably no more than 7% by volume. In addition to the non-sulfide reducing agents described above, other such reducing agents are thiourea dioxide, sodium hydrosulfite and thioglycolic acid. When a reducing sugar is used as the reducing agent, generally amounts in the range 1 to 10 grams per liter are employed at temperatures in the range 70 to 130° C. and an alkaline pH. The decreased oxygen content of the atmosphere can be achieved by flushing the dyeing apparatus with an inert gas, such as nitrogen. The dyeing apparatus is suitably a jet dyeing machine or a winch-beck dyeing machine. A vacuum pump may be connected to the dyeing apparatus to remove oxygen and establish a constant flow of the inert gas from an inert gas supply. Such a dyeing method is disclosed in U.S. patent application Ser. No. 08/518,626, the entire disclosure of which is incorporated herein by reference.

Another aspect of this invention is a method for determining the potential for a composition of matter to liberate hydrogen sulfide upon being acidified. More particularly, it is a method for determining the amount of hydrogen sulfide which a composition comprising material which forms hydrogen sulfide upon reacting with an acid, especially a composition comprising inorganic sulfides and/or inorganic polysulfides, has the potential to release upon being acidified.

The purpose of this method, which is essentially a test method, is to enable a person skilled in the art to predict, with greater accuracy than has been achievable by any method heretofore known to the present inventors, what is the maximum amount of hydrogen sulfide which would be released from a composition, particularly a composition containing inorganic sulfide and/or polysulfide, at a given temperature, if it were accidently or intentionally acidified.

According to this method, a weighed quantity of an aliquot portion of the composition to be tested, in the form of a solution or a dispersion or suspension of particles in a liquid at a preset temperature, is acidified to such an extent as to cause hydrogen sulfide gas to be generated, an inert gas is introduced into the liquid in an amount effective to remove the hydrogen sulfide gas from the liquid and carry it into an aqueous solution of a known concentration of an alkaline compound which is reactive with hydrogen sulfide to form a water-soluble sulfide salt, the reaction of the alkaline compound with the hydrogen sulfide takes place and the sulfide ion content of the resulting solution is measured.

The composition to be tested may be any composition of matter which can react with an acid to form hydrogen sulfide. Preferably, it is a composition which comprises an inorganic sulfide or an inorganic polysulfide. It may simply be an inorganic sulfide or polysulfide by itself. More usually, it will be a composition, such as industrial waste or a sulfur dye, which also contains other material and in which the inorganic sulfide and/or inorganic polysulfide is present as an essential component or as a contaminant. The "other material", itself, may also be capable of forming hydrogen sulfide upon acidification, but, preferably, this will not be the case. When the composition contains solid particles, any such particles in which sulfide or polysulfide could be trapped should preferably be no larger than they would be in normal usage, i.e. no larger than they would normally be at a time when they would intentionally or accidently be brought into contact with an acid in a situation other than during the test method of the invention, so that the test will give a reliable indication of how much hydrogen sulfide gas could be released as a result of acidification in such other situation. More preferably, any solid particles are in finely divided form. Most preferably, and particularly when the composition is a sulfur dye composition, the particle size is as specified above for sulfur dye suspensions (S') which constitute another aspect of the invention.

The method of this invention is especially suited for determining the amount of hydrogen sulfide that could potentially be released as a result of the accidental or intentional acidification of a sulfur dye composition which contains inorganic sulfides and/or inorganic polysulfides. Such a composition can be one in which the sulfur dye is essentially in solid particulate form, as in the slurries and the stable, pourable suspensions (S') described above, or it can be a liquid composition of a water-soluble prereduced leuco sulfur dye.

By "inorganic sulfides and/or inorganic polysulfides" is meant water-soluble salts, especially alkali metal salts, such as sodium sulfide and sodium polysulfide. Henceforth, for the sake of brevity, the term "inorganic (poly)sulfide" will be used to refer to inorganic sulfides and/or inorganic polysulfides, unless it is intended to distinguish between the two. The following description will focus on inorganic (poly)sulfides, but it will be understood that similar considerations apply to situations in which the composition to be tested comprises other material which can generate hydrogen sulfide upon acidification.

The liquid in which the acidification takes place may be any liquid in which the inorganic (poly)sulfide and the acid can react to form hydrogen sulfide. Preferably, it is an aqueous liquid, i.e. water or a mixture of water with an amount of a water-miscible liquid which will not interfere with the reaction, e.g. as desclosed above. More preferably, it is water alone.

The amount of the liquid in which the acidification takes place should preferably be such that all of the accessible inorganic (poly)sulfide present in the quantity of the composition being tested can become dissolved therein prior to the beginning of the acidification reaction. This is not essential, since dissolution of additional inorganic (poly) sulfide in the liquid can take place as that which is already in solution is converted to hydrogen sulfide and removed from the liquid. More preferably, the amount of liquid is sufficient to also dissolve any other component of the composition which is soluble in said liquid. For sulfur dye compositions it has been found that dependable results are obtained when the amount of liquid is such that the concentration of the dye is in the range 0.1 to 2.0%.

Preferably, the liquid contains an alkali to provide a buffer for better pH control during the acidification. Addition of enough sodium hydroxide to produce a 0.05N NaOH solution has been found to be satisfactory.

The temperature of the liquid at the commencement of the acidification should be the temperature at which it is desired to know how much hydrogen sulfide could be released upon acidification of another quantity of the same composition. The temperature may be any temperature at which it is felt that another quantity of the composition is likely to be when it is acidified, e.g. during storage, handling or actual use. The method of the invention can be carried out at various temperatures, preferably in the range 15 to 65° C, and has been carried out at various temperatures in the range 22 to 65° C. It is felt that temperatures in the range of normal room temperature, e.g. 20 to 25° C., are most significant, because they are the temperatures at which an accidental acidification is most likely to occur.

Any acid can be employed which is capable of converting as much as possible, preferably all, of the accessible inorganic sulfide and inorganic polysulfide present to hydrogen sulfide. Preferably, an acid is employed which is strong enough to maintain the acidification reaction mixture at the desired pH discussed below. In those situations where it is known that no inorganic polysulfide is present, a wider range of acids, including acetic acid, hydrochloric acid, methanesulfonic acid, sulfuric acid and phosphoric acid can be employed. Otherwise, it is preferred to use a stronger acid than acetic acid, such as methanesulfonic acid, hydrochloric acid, sulfuric acid or especially phosphoric acid, which, while strong enough to decompose inorganic polysulfide, is mild enough to make pH control easier.

The amount of acid employed should be that amount which will convert the greatest amount of inorganic (poly) sulfide to recoverable hydrogen sulfide. Care should be taken to avoid such over acidification as might cause protonation of the hydrogen sulfide, thereby rendering it more soluble in water and more difficult to recover. Preferably, an amount of acid used is such as will cause the liquid medium to have a pH in the range 2.9 to 3.7, more preferably, 3.0 to 3.5 during the acidification. Preferably, the rate of acid addition is controlled to keep the pH from dropping below 2.9.

Any inert gas capable of acting as a carrier for hydrogen sulfide gas may be used for the method of this invention. Helium and nitrogen come to mind, with the latter being more preferred. Preferably, the inert gas contains less than 20 parts per million (ppm), by volume, ofoxygen, more preferably less than 10 ppm, most preferably less than 5 ppm, especially less than 1 ppm. This may be accomplished by pretreating the gas in a commercially available oxygen removal device, such as a SUPELCO oxygen trap, or by bubbling it through an aqueous solution of oxalic acid. One may start with a commercially available gas which already has a low oxygen content (e.g. about 20 ppm), such as ultra high purity nitrogen, and pretreat it as discussed above.

The rate of inert gas feed is preferably such that a positive flow is established without splashing. More preferably, it is in the range 750 to 850 milliliters per minute, e.g. in a test on the scale of Example 8 below. The flow rate can be monitored with a conventional flow meter.

Preferably, the entire system is sparged with the pretreated inert gas prior to commencing the acidification. The inert gas is allowed to flow through the system until the maximum amount of the hydrogen sulfide has been swept from the vessel in which the acidification has been carried out. Usually it suffices to continue the flow for about 30 minutes after the acidification reaction has been completed.

The aqueous alkaline solution into which the hydrogen sulfide gas is swept by the inert gas may be a solution of any base which can react with the hydrogen sulfide to form a water-soluble sulfide salt without introducing any ions which would interfere with the subsequent analysis for sulfide ion concentration. Preferably, the base is an alkali metal hydroxide such as potassium hydroxide or, more preferably, sodium hydroxide. This solution must be of a known volume and contain at least a stoichiometric amount of the base with respect to the amount of hydrogen sulfide. The atmosphere above the alkaline solution can be checked for the presence of hydrogen sulfide gas using lead acetate paper. If the test is positive, more base should be added to the solution or a second solution of the base, also having a known volume, should be used to take up any excess hydrogen sulfide which is not captured in the first solution and the entire test method should be repeated with a fresh quantity of the composition to be tested. It has been found that the use of at least 2%, by weight, of sodium hydroxide in the first solution will usually suffice to capture all of the hydrogen sulfide from the sulfur dye compositions described above.

When as much as possible, preferably all, of the hydrogen sulfide has been taken up in the aqueous alkali, the resulting solution is analyzed for its sulfide ion content using methods known in the art, such as titration with excess iodine followed by back titration with sodium thiosulfate or, more preferably, ion chromatography. In this manner, a highly accurate measurement of the amount of sulfide ion obtained from the hydrogen sulfide generated by the acidification of the starting aliquot portion of the composition being tested is made and the capacity of said composition to generate hydrogen sulfide is determined.

Thus, the invention also provides a process for the production of a suspension (S') as described above in which process the (poly)sulfide content of a thionation mass is monitored during the oxidation and/or acidification thereof, so as to assure the desired low content of (poly)sulfide. In this way undesired overoxidation and/or over acidification can be avoided.

The following examples illustrate the invention. Unless otherwise indicated, all parts and percentages are by weight and all temperatures are in degrees Celsius. "C.I." stands for "Colour Index".

EXAMPLE 1

The reaction mixture obtained by a conventional thionation reaction for producing C.I. Sulfur Black 1 dye is aerated at 65–75° and pH 9.5 until acidification of a sample of the resulting slurry to pH 3 with phosphoric acid at 22° generates only enough hydrogen sulfide to produce, upon dissolution in an excess of aqueous sodium hydroxide, less than 50 ppm of sulfide ion, based on the weight of the dye. The rate of aeration is about 15 m$^3$ per minute per kilo of thionation reaction mixture. The slurry is filtered and 1918 grams of the resulting presscake, having a solids content of 65.7%, is mixed with 1082 grams of water with stirring. To this mixture is added 11.3 grams of 98% sulfuric acid, whereby the pH is lowered from 8.9 to 7.5, and then 6 grams of xanthan gum (KELZAN from Kelco, a unit of Monsanto Company) are added slowly at room temperature to the upper portion of the vortex created by rapid stirring of the mixture. To the resulting suspension are added 750 grams of water to adjust the dyeing strength and an additional 1.5 grams of xanthan gum. The resulting product has a viscosity of 800 cP and, when acidified to pH 3 with phosphoric acid at 22°, generates less hydrogen sulfide than can produce 50 ppm of sulfide ion in aqueous sodium hydroxide, as measured by ion chromatography.

EXAMPLE 2

To 300 grams of crude aqueous thionation reaction mixture for the sulfurized vat dye C.I. Vat Blue 43, produced in conventional manner, is added 300 grams of water and 15 grams of sodium nitrite. The resulting mixture is heated to reflux for about two hours until a spot test shows a clear runout. The pH of the resulting slurry is adjusted to 7.5 with sulfuric acid and it is diluted with an additional 600 grams of water to adjust the dyeing strength. To the diluted product is added, at ambient temperature and with stirring, 0.37% KELZAN xanthan gum, based on the total weight. Analysis of the resulting suspension as described above, shows less than 10 ppm of sulfide ion based on the weight of the dye. It is stable with respect to the uniform distribution of the dye particles for more than two months.

EXAMPLE 3

Into 6475 grams of water are stirred 8725 grams of a C.I. Sulfur Black 1 dye presscake produced as in Example 1 but having a solids content of 66.2%. After stirring for 10 minutes the pH is adjusted to 7.25 with 130.5 grams of 98% sulfuric acid and then 33.4 grams of KELZAN xanthan gum are added with rapid stirring at room temperature over a period of 10 minutes. Stirring is continued for about one hour and then 2255 grams of water are added with further stirring to adjust the dye strength. The resulting suspension has a viscosity of 482 cP and produces less than 50 ppm of sulfide ion, based on the weight of the dye, when tested as described above. For protection against degradation due to microorganisms, a preservative may be added, as described above.

EXAMPLE 4

Twelve grams of the product of Example 1 and 205 grams of water are mixed in a beaker. To this mixture are added 19 grams of 50% aqueous sodium hydroxide, followed by 20 ml. of a 53% solution of glucose in water and then 2.0 ml. of mixed mono- and diphosphate esters of 2-ethylhexanol. This mixture is poured into the trough of a pad dyeing apparatus, heated to 38 to 54° stirred for 10 minutes. A length of cotton textile material is padded with the heated dyeing liquor and then steamed for at least 60 seconds in a Greenville/Aztec steamer. The dyed material is immediately washed in water for at least 30 seconds and then oxidized for at least 60 seconds at 60° in a 2% aqueous solution of a 50:50 mixture of sodium vanadate-catalyzed sodium bromate (DYETONE) and glacial acetic acid, which solution also contains an effective amount of a sodium salt of an acrylic acid homopolymer (SANDOPURE RSK) as an antiredeposition aid. It is then rinsed in warm running water for at least 30 seconds and dried on a flat bed press.

EXAMPLE 5

A jet dyeing machine is loaded with a cotton textile material to be dyed and enough water to give a liquor:goods ratio of about 10:1 and the contents are heated to 49° C. To the heated bath are added 0.5 g/L of SULFALOX 100 (aqueous alkaline solution of ethylenediaminetetraacetic acid), 0.5 g/L of SODYECO Defoamer DSV (proprietary mixture of petroleum derivatives), 25 g/L of sodium sulfate, 5 g/L of soda ash, 5 g/L of caustic soda (50%) and 5 g/L of a mixture of 94.5%, by weight, glucose, 5% reductive dispersing agent and 0.5% dedusting oil. To the resulting mixture is added gradually over 5 minutes an amount of the product of Example 1 sufficient to provide 16% dye based on the weight of the textile material and the resulting mixture is heated to 71° C. at a rate of 2.75°/min. while the atmosphere above the liquor in the apparatus is being purged with nitrogen. The resulting dyebath is then heated to 93° C. at a rate of 2.75°/min. and held at that temperature for 45 minutes. The dyebath is then cooled to 71° C. and the contents are overflow rinsed with unheated water until the bath water is clear. The liquor:goods ratio is readjusted to 10:1 and the bath is heated to 49° C. while the interior of the apparatus is aerated. Two g/L of acetic acid (56%) and 2 g/L of DYETONE (aqueous 12% sodium bromate/1% sodium vanadate solution) are added and the resulting oxidation bath is heated to 65° C. and held at that temperature for 10 minutes. The bath is then overflow rinsed and drained and the apparatus is refilled with water to which 1 g/L of soda ash is added. The dyed textile material is then scoured in the resulting liquor for 10 minutes at 88° C. The bath is then cooled to 71° C. and the dyed material is removed therefrom.

EXAMPLE 6

Into a solution prepared by mixing 176 g of water and 150 g of d-glucose is stirred 174 g of C.I. Sulfur Black 1 presscake prepared as in Example 1 but containing about 70%, by weight, solids and 30% water. The pH of the resulting slurry is adjusted to 7–7.5 with 1.1 g of 98% sulfuric acid and then 2.0 g of KELZAN xanthan gum are added thereto. The resulting slurry has a viscosity of 560 cP as measured with a Brookfield viscometer with a #3 spindle at 60 rpm.

EXAMPLE 7

C.I. Sulfur Black 1 thionation reaction mass is prepared in conventional manner as follows:
a) Eighty five hundred parts of water, 2151 parts of aqueous sodium hydroxide (50%) and 2485 parts of 2,4-dinitrochlorobenzene are heated together at 95° for thirty minutes.
b) A mixture of 1465 parts of aqueous sodium hydroxide (50%) and 2300 parts of sodium sulfhydrate solution (45%) is heated to 70° and 1780 parts of sulfur are added to said mixture. The resulting reaction mass is stirred at 70–80° for about thirty minutes until dissolution occurs and the resulting polysulfide reaction product is heated to 118°.
c) The phenolate reaction product obtained in part (a) is added to polysulfide reaction product obtained in part (b) and the resulting mixture is stirred for 10 hours at 120–124°.

The thionation reaction mass from part (c) is aerated as in Example 1 until a sample of the resulting slurry gives a faint blue run-out when tested by the spot test described above. The resulting slurry is adjusted to pH 6 with sulfuric acid (25%) and then filtered as in Example 1 to give 4500 parts of presscake. This presscake is processed into a stable dye suspension in the manner disclosed in Example I but without the need for further pH adjustment.

A dyeing liquor is prepared as follows:
The mixing tank of a continuous dyeing apparatus is filled to one-third of a predetermined final volume with water at 38° and a sufficient amount of a dye suspension, prepared as described in this example, is added thereto to give a concentration of 225 g of dye suspension per liter, based on said predetermined final volume. To this mixture are added, with continued mixing, sufficient aqueous glucose (53%) reducing agent and sufficient aqueous sodium hydroxide (50%) to provide 75 g/l of each total product, based on said predetermined final volume. Sufficient water is then added to bring the mixture to two-thirds of the predetermined final volume and sufficient sodium hydrosulfite is added to give a concentration of 15 g/l, based on the predetermined final volume. Water is then added to bring the resulting mixture to the predetermined final volume and said resulting mitre is heated to 49° with mixing and held at this temperature for ten minutes.

Cotton fabric moving at a speed of 75 yards/min. is padded with water to wet out evenly and dried (an optional treatment). It is then padded with the above-described dyeing liquor in a padder having three rollers forming two nips, with pressure across the second nip being 21.5 pounds per square inch (psi) and 22 psi, respectively, at the ends and 23 psi in the middle. Pad-dwell time is one second (from immersion into the liquor to exit from the second nip). The fabric is then steamed at 103° for 47 seconds and then washed in eight successive wash boxes containing water at the following successive temperatures: 40°, 46°, 54°, 54°, 71°, 74°, 71° and 54°. The fourth and fifth wash boxes also contain 7.5 g/l of catalyzed sodium bromate, e.g. CHEMOXY SG, as an oxidizing agent. The washed fabric is dried on dry cans and wound on an A-frame. The resulting dyeing is characterized by very good washfastness.

EXAMPLE 8 a) Generation of Hydrogen Sulfide and Isolation of Sulfide Ions

A 250 ml three-neck flask with 24/40 joints containing a magnetic stirring bar is clamped above a magnetic stirrer. A pH electrode, which is attached to a calibrated pH meter, is placed (with an adapter) in the center neck and a 60 ml graduated addition funnel with pressure equalizing is placed in one side neck and a sparging tube with a gas inlet/outlet adapter is placed in the other side neck. The outlet from a nitrogen gas regulator attached to a source of ultra high purity nitrogen is connected to a Kings Instrument Inc. Flow Meter (470 to 940 ml/min) with ¼ inch Tygon tubing and from there to a 250 mnl gas washing bottle with fritted glass diffuser to be used as an oxygen trap. Tygon tubing from the oxygen trap is split with a "T" connector, with one branch being connected to the sparging tube of the three-neck flask and the other branch, which is equipped with a clamp for cutting off nitrogen flow, being connected to the graduated addition funnel. The outlet from the adapter with the sparging tube on the three-neck flask is connected via Tygon tubing to the sparging tube of another 250 ml gas washing bottle with fritted glass diffuser, which serves as the hydrogen sulfide trap, and the outlet from said hydrogen sulfide trap is connected to a vent. All connections are made tight with suitable clamps, such as Keck clamps at all 24/40 joints, and strips of moistened lead acetate paper are placed at all joints to detect any hydrogen sulfide leaks.

One gram of oxalic acid is dissolved with thorough mixing in 100 grams of deionized water and 100 ml of this solution is placed in the oxygen trap. A small magnetic stirring bar, 50.0 ml of 4% aqueous sodium hydroxide, which has been produced by mixing 40 grams of sodium hydroxide pellets with 960 grams of deionized water and sparging for 30 minutes with nitrogen, and 50.0 ml deionized water are placed in the bottle serving as the hydrogen sulfide trap, the diffuser tube top is attached, and the bottle is placed on a magnetic stirrer. One half gram (±0.1 mg) of the product of Example 3 is placed in the three-neck flask. A mixture of 5 ml 4% aqueous sodium hydroxide and 170 ml nitrogen-sparged deionized water is introduced into the three-neck flask. Sixty ml of an 8.5% phosphoric acid solution prepared by mixing 100 grams of 85% phosphoric acid with 900 ml deionized water are added to the graduated addition funnel in the side neck of the three-neck flask and the funnel is then flushed for about 10 seconds with the pretreated nitrogen by opening the clamp of the Tygon tubing connected thereto. The clamp is then tightened, so that the nitrogen will flow only through the sparging tube in the other side neck of the three-neck flask.

The magnetic stirrers are activated and nitrogen flow is commenced at a rate such that there is no splashing of the contents of the vessels comprising the apparatus as described above, preferably at about 770 ml per minute. The dropwise addition of the phosphoric acid solution into the dye-containing three-neck flask is then commenced at a rate of about 10 ml per minute. When the pH of the acidification reaction mixture has dropped to about 4, the addition is continued at a slower rate until the pH is in the range 2.97 to 3.03. At this point acid addition is discontinued and is resumed only as necessary to return the pH to said range from a higher pH which develops as the acid is reacted. When the pH stabilizes in the range 2.97 to 3.03, acid addition is terminated, but nitrogen flow is continued for an additional 30 minutes, by which time the reaction is complete and all of the hydrogen sulfide generated should have been swept into the bottle serving as the hydrogen sulfide trap and containing the 100 ml of sodium hydroxide solution. The contents of the hydrogen sulfide trap are then subjected to analysis by ion chromatography to determine the sulfide ion content.

b) Determination of Sulfide Ion Concentration by Ion Chromatography

Instrumentation: Dionex 4500i Chromatograph equipped with a gradient pump, pulsed amperometric detector and an AI450 data station.

Instrumentation parameters

Column: Dionex IonPac BPIC -AS7 column together with a AG7 guard column;

Eluant: 100% 0.5M sodium acetate, 0.1M sodium hydroxide ($CO_2$ free), 0.5%
(v/v) ethylene diamine (99+%) in helium-purged deionized water;

Flow rate: 1.0 ml per minute;

Detector: Pulsed Amperometric Detector with silver electrode at zero voltage;

Injection loop: 50 microliter;

Temperature: ambient.

Sample preparation: In a 100 ml volumetric flask 0.01 gram (±0.01 mg) of the sulfide ion-containing solution from part (a) of this Example is diluted to 10 ml with 0.1N sodium hydroxide solution prepared by dissolving 8.0 grams of $CO_2$ free 50% (w/w) NaOH in 1 liter of helium-purged deionized water.

Standard preparation: In a volumetric flask 7.5 mg (±0.01 mg) of sodium sulfide nonahydrate (98% A.C.S. grade) is diluted to 100 ml with 0.1N helium-purged sodium hydroxide and 0.5 ml of this solution is diluted to 10 ml with 0.1N sodium hydroxide prepared as described above. Three portions of this standard are analyzed to obtain an average response factor before analyzing the sample.

The ion chromatography system is purged with helium for at least one hour to exclude the presence of carbon dioxide.

Ion chromatography of the sample is carried out and the amount of sulfide ion is calculated according to the equation:

$$\text{Concentration of } S^- \text{ (ppm)} = \frac{\text{Concentration of Sulfide Ion in Sample}^* \times 1{,}000{,}000}{\text{Concentration of Sample}^{**}}$$

It is determined that the suspension produced according to Example 3 generates an amount of hydrogen sulfide which produces less than 10 ppm sulfide ion according to this test method.

We claim:

1. A pourable aqueous liquid suspension (S') consisting essentially of an aqueous liquid, a solid particulate sulfur dye and a suspension stabilizing agent (A) in an amount effective to maintain a uniform distribution of the sulfur dye in suspension for a period of at least 24 hours, said suspension stabilizing agent (A) being one or more water-soluble polysaccharides whose solutions in water are pseudoplastic and being present in an amount of less than 10% by weight of the suspension, said suspension having a content of inorganic sulfides and inorganic polysulfides such that upon being acidified to pH 3 with phosphoric acid at 22° C. will generate no more hydrogen sulfide than can react with aqueous sodium hydroxide to form 1000 ppm of sulfide ion based on the weight of the sulfur dye.

2. A suspension (S') according to claim 1 wherein the the distribution of the solid particles is uniform for at least two months.

3. A suspension (S') according to claim 1 which has a viscosity no higher than 5000 cP.

4. A suspension (S') according to claim 3 which has a viscosity in the range 300 to 4000 cP.

5. A suspension (S') according to claim 1 which is stable for at least two months against such a permanent change in viscosity as will render it unpourable.

6. A suspension (S') according to claim 5 which is stable against a change in viscosity of more than 50% measured in centipoise.

7. A suspension (S') according to claim 1 wherein the concentration of the suspension stabilizing agent (A) is less than 5%, by weight of the suspension.

8. A suspension (S') according to claim 7 wherein the concentration of suspension stabilizing agent (A) is less than 1%, by weight.

9. A suspension (S') according to claim 1 which contains less than 5% by weight, based on the total weight of said suspension, of viscosity-increasing agents or other substances which are effective to prevent a sulfur dye from settling out of said suspension, other than the water-soluble polysaccharide and, optionally, a dispersing agent.

10. A suspension (S') according to claim 9 which is free from viscosity-increasing agents or other substances which are effective to prevent a sulfur dye from settling out of said suspension, other than the water-soluble polysaccharide and, optionally, a dispersing agent.

11. A suspension (S') according to claim 1 wherein the dye is a C.I. Sulfur Dye.

12. A suspension (S') according to claim 1 wherein the suspension stabilizing agent (A) is a microbial polysaccharide.

13. A suspension (S') according to claim 12 wherein the suspension stabilizing agent (A) is welan gum or xanthan gum.

14. A suspension (S') according to claim 13 wherein the suspension stabilizing agent (A) is xanthan gum.

15. A suspension (S') according to claim 1 which does not contain a dispersing agent and wherein the sulfur dye is C.I. Sulfur Black 1, C.I. Sulfur Blue 7, C.I. Vat Blue 43, C.I. Sulfur Red 10 or C.I. Sulfur Brown 96.

16. A suspension (S') according to claim 1 wherein the sulfur dye is C.I. Sulfur Black 1.

17. A suspension (S') according to claim 1 which, upon being acidified to pH 3 with phosphoric acid at 22° C., will generate no more hydrogen sulfide than can react with aqueous sodium hydroxide to form 500 parts per million of sulfide ion based on the weight of the sulfur dye.

18. A suspension (S') according to claim 17 which, upon being acidified to pH 3 with phosphoric acid at 22° C., will generate no more hydrogen sulfide than can react with aqueous sodium hydroxide to form 50 parts per million of sulfide ion based on the weight of the sulfur dye.

19. A suspension (S') according to claim 11 wherein the dye is selected from the group consisting of C.I. Sulfur Black 1, C.I. Sulfur Blues 7, 13 and 15, C.I. Sulfur Reds 10 and 14, C.I. Sulfur Greens 2 and 16 and C.I. Sulfur Browns 3, 7 and 96.

20. A suspension (S') according to claim 19 which contains no dispersing agent and wherein the dye is C.I. Sulfur Black 1, C.I. Sulfur Blue 7, C.I. Sulfur Red 10 or C.I. Sulfur Brown 96.

21. A suspension (S') according to claim 16 which contains no dispersing agent.

22. A method for producing a suspension (S') according to claim 1 which comprises combining an aqueous liquid, a solid particulate sulfur dye which is insoluble or sparingly soluble in the liquid and which is sufficiently free from inorganic sulfides and inorganic polysulfides that an aqueous slurry thereof, when acidified to pH 3 with phosphoric acid at 22° C. will generate no more hydrogen sulfide than can produce, upon reaction with aqueous sodium hydroxide, 1000 parts per million of sulfide ion, based on the weight of the dye, and an effective amount of the polysaccharide suspension stabilizing agent (A) which is soluble in the aqueous liquid.

23. A method according to claim 22 wherein the solid particulate sulfur dye is sufficiently free from inorganic sulfides and inorganic polysulfides that an aqueous slurry thereof, when acidified to pH 3 with phosphoric acid at 22° C., will generate no more hydrogen sulfide than can produce, upon reaction with aqueous sodium hydroxide, 100 parts per million of sulfide ion, based on the weight of the dye.

24. A method according to claim 22 which further comprises the steps of producing the solid particulate sulfur dye by treating a thionation reaction mass obtained from a thionation reaction with sufficient oxidation or acidification or both, optionally with sufficient removal of unconverted inorganic sulfides and/or inorganic polysulfides by filtration or decantation, to produce solid particles of sulfur dye which are free from inorganic sulfides and inorganic polysulfides to the extent that an aqueous mixture of said dye, upon being acidified to pH 3 with phosphoric acid at 22° C., will generate no more hydrogen sulfide than can produce 1000 parts per million, by weight, sulfide ion in aqueous alkali based on the weight of the dye.

25. A method according to claim 23 which comprises measuring the capacity of the aqueous slurry of sulfur dye particles to generate hydrogen sulfide at 22° C. by acidifying an aliquot portion of said slurry at 22° C. to pH 3 with phosphoric acid, sweeping the acidification reaction mixture with an amount of an inert gas effective to remove substantially all of the hydrogen sulfide therefrom, collecting substantially all of the hydrogen sulfide from said acidification reaction mixture in an aqueous alkaline solution and measuring the amount of sulfide ion in said alkaline solution.

26. A suspension (S') according to claim 1 in which the sulfur dye particles have a mean particle volume greater than 10 microns.

27. A method according to claim 23 wherein the solid particles of sulfur dye are not subjected to a milling treatment.

28. A suspension (S') according to claim 14 which contains less than 5% by weight, based on the total weight of said suspension, of viscosity-increasing agents or other substances which are effective to prevent a sulfur dye from settling out of said suspension, other than the xanthan gum and, optionally, a dispersing agent.

29. A suspension (S') according to claim 28 which is free from viscosity-increasing agents or other substances which are effective to prevent a sulfur dye from settling out of said suspension, other than the xanthan gum and, optionally, a dispersing agent.

30. A method according to claim 24 wherein the thionation reaction mass is treated with oxidation.

31. A suspension (S') according to claim 1 having a viscosity in the range 350 to 2000 cP.

32. A suspension (S') according to claim 31 wherein the concentration of sulfur dye is in the range 10 to 45%, by weight, based on the total weight of the composition.

33. A suspension (S') according to claim 32 wherein the suspension stabilizing agent (A) is xanthan gum.

34. A suspension (S') according to claim 33 wherein the dye is a C.I. Sulfur Dye.

35. A suspension (S') according to claim 1 wherein the suspension stabilizing agent (A) is non-thixotropic.

36. In a method for dyeing a substrate dyeable with a sulfur dye wherein the sulfur dye is treated with a reducing agent in aqueous alkali, the improvement which comprises employing the sulfur dye in the form of a suspension (S') according to claim 1.

37. A suspension (S') according to claim 1 wherein the water-soluble polysaccharide comprises more than 80%, by weight, of the total amount of substances present in the suspension which are effective for preventing the sulfur dye from settling out of the suspension for a period of at least twenty-four hours without permanently increasing the viscosity of the suspension to a point where it is not pourable.

38. A suspension (S') according to claim 37 wherein the water-soluble polysaccharide comprises 100%, by weight, of the total amount of substances present in the suspension which are effective for preventing the sulfur dye from settling out of the suspension for a period of at least twenty-four hours without permanently increasing the viscosity of the suspension to a point where it is not pourable.

39. A suspension (S') according to claim 38 wherein the water-soluble polysaccharide is a microbial polysaccharide.

40. A suspension (S') according to claim 38 wherein the water-soluble polysaccharide is welan gum or xanthan gum.

41. A suspension (S') according to claim 14 wherein the xanthan gum comprises 100%, by weight, of the total amount of substances present in the suspension which are effective for preventing the sulfur dye from settling out of the suspension for a period of at least twenty-four hours without permanently increasing the viscosity of the suspension to a point where it is not pourable.

42. A suspension (S') according to claim 14 wherein the xanthan gum comprises at least 80%, by weight, of the total amount of substances present in the suspension which are effective for preventing the sulfur dye from settling out of the suspension for a period of at least twenty-four hours without permanently increasing the viscosity of the suspension to a point where it is not pourable.

43. A suspension (S') according to 42 wherein the sulfur dye is a C.I. Sulfur Dye.

44. A method according to claim 36 which is an exhaust or continuous dyeing wherein only non-sulfide reducing agents are employed.

45. A suspension (S') according to claim 41 wherein the sulfur dye is selected from the group consisting of C.I. Sulfur Black 1, C.I. Sulfur Blues 7, 13 and 15, C.I. Sulfur Reds 10 and 14, C.I. Sulfur Greens 2 and 16 and C.I. Sulfur Browns 3, 7 and 96.

46. A suspension (S') according to claim 45 wherein the sulfur dye is C.I. Sulfur Black 1.

47. A suspension (S') according to claim 38 wherein the aqueous liquid is water or a mixture of water and no more than 10%, by weight of such mixture, of a water-miscible organic liquid.

48. A suspension (S') according to claim 47 wherein the liquid component of the suspension consists of water alone.

49. A suspension (S') according to claim 37 wherein the aqueous liquid is water or a mixture of water and no more than 10%, by weight of such mixture, of a water-miscible organic liquid.

50. A suspension (S') according to claim 49 wherein the liquid component of the suspension consists of water alone.

51. A method according to claim 24 wherein the solid particles are not subjected to a milling treatment.

52. A method according to claim 24 wherein the size of the particles of sulfur dye is obtained without mechanical particle size reduction.

53. A pourable suspension (S') of a solid particulate sulfur dye in an aqueous liquid containing a suspension stabilizing agent (A) in an amount effective to maintain a uniform distribution of the solid particulate sulfur dye in the suspension for a period of at least 24 hours, said suspension stabilizing agent (A) being a one or more water-soluble polysaccharides whose solutions in water are pseudoplastic and being present in a total amount which is less than 10% by weight of the suspension, and said suspension having a content of inorganic sulfides and inorganic polysulfides such that upon being acidified to pH 3 with phosphoric acid at 22° C. will generate no more hydrogen sulfide than can react with aqueous sodium hydroxide to form 1000 parts per million of sulfide ion based on the weight of the sulfur dye.

54. A pourable suspension (S') of a solid particulate sulfur dye in an aqueous liquid containing a suspension stabilizing agent (A) in an amount effective to maintain a uniform distribution of the solid particulate sulfur dye in the suspension for a period of at least 24 hours, said suspension stabilizing agent (A) being one or more water-soluble polysaccharides whose solutions in water are pseudoplastic and being present in a total amount which is less than 10% by weight of the suspension and said suspension (S') containing less than 5%, by weight of the suspension, of viscosity-increasing agents or other substances which are effective to prevent a sulfur dye from settling out of said suspension, other than the one or more water-soluble polysaccharides and, optionally, a dispersing agent.

55. A pourable suspension of solid particulate C.I. Sulfur Dye selected from the group consisting of C.I. Sulfur Black 1, C.I. Sulfur Blue 7, C.I. Sulfur Red 10 and C.I. Sulfur Brown 96 in an aqueous liquid containing a water-soluble polysaccharide in an amount effective to maintain a uniform distribution of the dye in the suspension for a period of at least 24 hours, which suspension does not contain a dispersing agent.

56. A suspension (S') according to claim 55 which further comprises a non-sulfide reducing agent (R).

57. A suspension (S') according to claim 56 wherein the non-sulfide reducing agent (R) is a compound of formula (I) or (II)

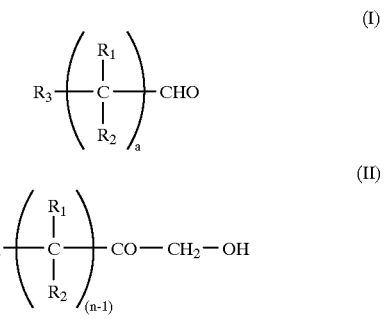

wherein one of $R_1$ and $R_2$ is hydrogen and the other is —OH, —OCH$_3$ or —NH$_2$, $R_3$ is —CH$_3$, —CH$_2$OH, —CHO or —COOX, X is hydrogen or a cation and n is an integer from 1 to 5.

58. A pourable suspension (S') of a solid particulate sulfur dye in an aqueous liquid containing a non-sulfide reducing agent (R) and a suspension stabilizing agent (A) in an amount effective to maintain a uniform distribution of the solid particulate sulfur dye in the suspension for a period of at least 24 hours, said suspension stabilizing agent (A) being a one or more water-soluble polysaccharides whose solutions in water are pseudoplastic and being present in a total amount which is less than 10% by weight of the suspension, said suspension having a content of inorganic sulfides and inorganic polysulfides such that upon being acidified to pH 3 with phosphoric acid at 22° C. generate no more hydrogen sulfide than can react with aqueous sodium hydroxide to form 1000 ppm of sulfide ion based on the weight of the sulfur dye.

59. A suspension (S') according to claim 58 whose content of inorganic sulfides and inorganic polysulfides is such that, upon being acidified to pH 3 with phosphoric acid at 22° C., it will generate no more hydrogen sulfide than can react with aqueous sodium hydroxide to form 1000 parts per million of sulfide ion based on the weight of the sulfur dye.

60. A suspension (S') according to claim 58 wherein the non-sulfide reducing agent (R) is a compound of formula (I) or (II)

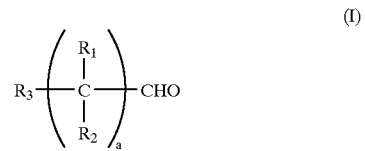

-continued

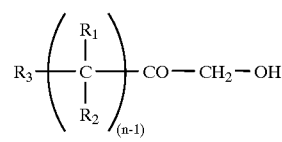
(II)

wherein one of $R_1$ and $R_2$ is hydrogen and the other is —OK, —OCH$_3$ or —NH$_2$, $R_3$ is —CH$_3$, —CH$_2$OH, —CHO or —COOX, X is hydrogen or a cation and n is an integer from 1 to 5.

61. A suspension (S') according to claim 60 wherein the non-sulfide reducing agent (R) is glucose.

62. A pourable suspension (S') of a solid particulate sulfur dye in an aqueous liquid containing a suspension stabilizing agent (A) in an amount effective to maintain a uniform distribution of the solid particulate sulfur dye in the suspension for a period of at least 24 hours, said suspension stabilizing agent (A) being a one or more water-soluble polysaccharides whose solutions in water are pseudoplastic and being present in a total amount which is less than 10% by weight of the suspension and more than 80%, by weight, of the total amount of substances present in the suspension which are effective for preventing the sulfur dye from settling out of the suspension for a period of at least twenty-four hours without permanently increasing the viscosity of the suspension to a point where it is not pourable.

63. A suspension (S') according to claim 62 wherein the water-soluble polysaccharide comprises 100%, by weight, of the total amount of substances present in the suspension which are effective for preventing the sulfur dye from settling out of the suspension for a period of at least twenty-four hours without permanently increasing the viscosity of the suspension to a point where it is not pourable.

64. A suspension (S') according to claim 63 whose content of inorganic sulfides and inorganic polysulfides is such that, upon being acidified to pH 3 with phosphoric acid, it will generate no more hydrogen sulfide than can react with aqueous sodium hydroxide to form 1000 parts per million of sulfide ion based on the weight of the sulfur dye.

65. A suspension (S') according to claim 63 wherein the water-soluble polysaccharide is welan gum or xanthan gum.

* * * * *